US012710986B2

(12) United States Patent
Boikos et al.

(10) Patent No.: US 12,710,986 B2
(45) Date of Patent: Aug. 18, 2026

(54) CIRCUIT AND METHOD FOR DYNAMIC REGISTER ALLOCATION FOR A GRAPHICS PROCESSING UNIT

(71) Applicant: Arm Limited, Cambridge (GB)

(72) Inventors: Konstantinos Boikos, Cambridge (GB); Isidoros Sideris, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 19/035,024

(22) Filed: Jan. 23, 2025

(65) Prior Publication Data

US 2025/0251937 A1 Aug. 7, 2025

(30) Foreign Application Priority Data

Feb. 2, 2024 (EP) .................................... 24386009

(51) Int. Cl.
*G06F 9/50* (2006.01)
*G06F 9/30* (2018.01)
*G06F 9/38* (2018.01)
*G06F 12/02* (2006.01)

(52) U.S. Cl.
CPC .......... *G06F 9/5016* (2013.01); *G06F 9/3004* (2013.01); *G06F 9/3013* (2013.01); *G06F 12/023* (2013.01)

(58) Field of Classification Search
CPC .... G06F 9/5016; G06F 9/3004; G06F 9/3013; G06F 12/023; G06F 9/3851; G06F 12/0292; G06F 12/02; G06F 9/38
See application file for complete search history.

(56) References Cited

U.S. PATENT DOCUMENTS 6,510,505 B1 1/2003 Burns et al.
10,698,687 B1 * 6/2020 Tan ....................... G06F 9/3867
2013/0246761 A1 9/2013 Derby et al.
2017/0115923 A1 * 4/2017 Hurvitz ................. G06F 12/023
2019/0087229 A1 * 3/2019 Luliano ................... G06F 9/544
2021/0208924 A1 * 7/2021 Krueger ................ G06F 3/0679
2022/0253236 A1 * 8/2022 Zhang .................. G06F 3/0679
(Continued)

FOREIGN PATENT DOCUMENTS

EP 2219114 A1 8/2010

OTHER PUBLICATIONS

Combined Search and Examination report issued in United Kingdom Application No. 2406784.5, mailed Apr. 10, 2025, 9 pages.

*Primary Examiner* — Shawn Doman
(74) *Attorney, Agent, or Firm* — Talem IP Law, LLP

(57) ABSTRACT

A circuit and method for dynamic register allocation for a graphics processing unit is provided. The circuit includes circuitry to receive a binary vector having a length of M bits, the binary vector indicating one or more available blocks of memory in a register file memory; to perform a parallel prefix scanning method to identify positions of bits in-order within the binary vector to search for the one or more available blocks of memory in the register file memory to generate an allocation state for a warp, and to decode the allocation state into entries for a lookup table used to generate memory addresses of available blocks of register file memory. The parallel prefix multilayer scanning method includes scanning the binary vector for high bits in-order. The high bits indicating the one or more available blocks of memory in a register file memory.

20 Claims, 12 Drawing Sheets

RECEIVE A BINARY VECTOR HAVING A LENGTH OF M BITS 602

SCAN THE BINARY VECTOR FOR HIGH BITS IN ORDER BY PERFORMING A GROUP FUNCTION ON A CORRESPONDING GROUP OF BITS OF THE BINARY VECTOR FOR GROUPS OF BITS OF THE BINARY VECTOR USING LOGIC OF A PARALLEL PREFIX TREE TO PRODUCE A GROUP RESULT FOR EACH GROUP FUNCTION PERFORMED 604

COMBINE THE GROUP RESULT FOR EACH GROUP FUNCTION TO PRODUCE A PARALLEL PREFIX TREE OUTPUT 606

COMBINE THE PARALLEL PREFIX TREE OUTPUT WITH THE BINARY VECTOR TO GENERATE AN ENCODED VECTOR INDICATING POSITIONS OF THE HIGH BITS IN-ORDER 608

(56) References Cited

U.S. PATENT DOCUMENTS

2022/0413916 A1* 12/2022 Gurram ................. G06F 9/5016
2025/0199688 A1* 6/2025 Oberberger ........... G06F 3/0659
2025/0322948 A1* 10/2025 Rucker ............... G06F 9/30038

* cited by examiner

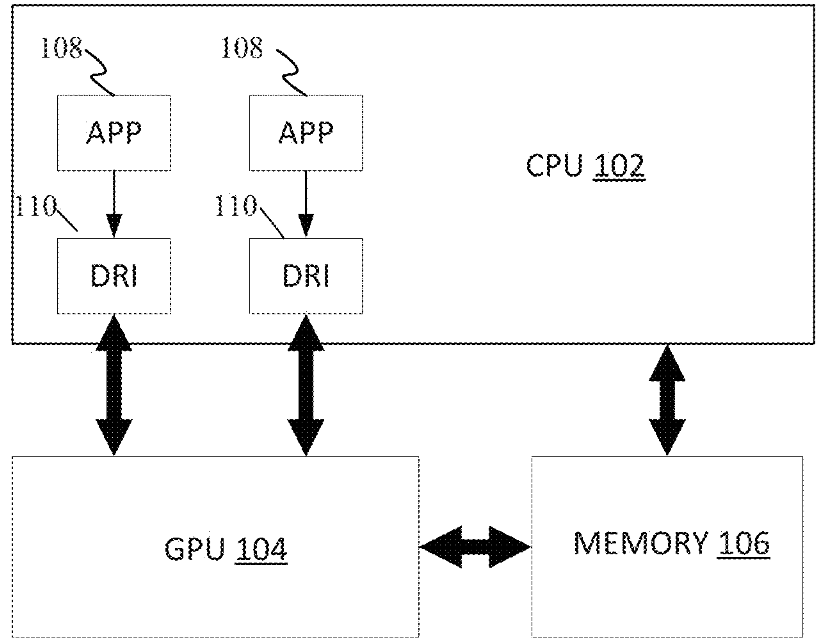
FIG. 1

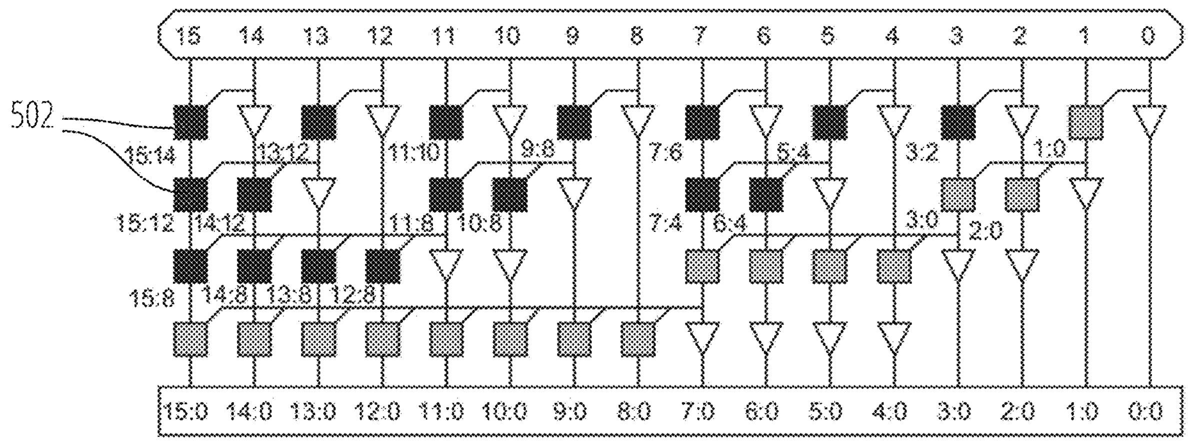
FIG. 5

RECEIVE A BINARY VECTOR HAVING A LENGTH OF M BITS 602

SCAN THE BINARY VECTOR FOR HIGH BITS IN ORDER BY PERFORMING A GROUP FUNCTION ON A CORRESPONDING GROUP OF BITS OF THE BINARY VECTOR FOR GROUPS OF BITS OF THE BINARY VECTOR USING LOGIC OF A PARALLEL PREFIX TREE TO PRODUCE A GROUP RESULT FOR EACH GROUP FUNCTION PERFORMED 604

COMBINE THE GROUP RESULT FOR EACH GROUP FUNCTION TO PRODUCE A PARALLEL PREFIX TREE OUTPUT 606

COMBINE THE PARALLEL PREFIX TREE OUTPUT WITH THE BINARY VECTOR TO GENERATE AN ENCODED VECTOR INDICATING POSITIONS OF THE HIGH BITS IN-ORDER 608

FIG. 6

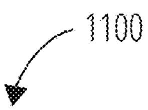

RECEIVE A BINARY VECTOR HAVING A LENGTH OF M BITS, THE BINARY VECTOR INDICATING ONE OR MORE AVAILABLE BLOCKS OF MEMORY IN A REGISTER FILE MEMORY 1102

PERFORM A PARALLEL PREFIX SCANNING METHOD TO IDENTIFY POSITIONS OF HIGH BITS IN-ORDER WITHIN THE BINARY VECTOR TO SEARCH FOR THE ONE OR MORE AVAILABLE BLOCKS OF MEMORY IN THE REGISTER FILE MEMORY AND GENERATE AN ALLOCATION STATE FOR A WARP 1104

DECODE THE ALLOCATION STATE INTO ENTRIES FOR A LOOKUP TABLE USED TO GENERATE MEMORY ADDRESSES OF AVAILABLE BLOCKS OF REGISTER FILE MEMORY 1106

FIG. 11

CIRCUIT AND METHOD FOR DYNAMIC REGISTER ALLOCATION FOR A GRAPHICS PROCESSING UNIT

BACKGROUND

Graphic processing units (GPUs) are a type of parallel processing unit that break up tasks to run in parallel in order to speed up the processing time. Parallel processing units such as GPUs are capable of high performance using a relatively large number of parallel execution threads executed on dedicated programmable hardware processing engines. In some GPUs, single instruction multiple thread (SIMT) techniques are used to support the parallel execution of the large number of generally synchronized threads. In operation, the GPU may organize the threads into groups. Each group, also known as a warp, is executed simultaneously. High performance can be achieved by executing multiple warps in parallel.

Many GPUs now include one or more execution engines, organized in processing cores, commonly referred to as 'shader cores'. The software that runs on an execution engine is commonly referred to as a 'shader'. In the context of computer graphics, a shader is a user defined program that calculates appropriate levels of light, darkness, and color in a three-dimensional view to render the view as realistic as possible. Besides graphics, many GPUs are also capable of running general purpose software while taking advantage of their SIMT capabilities. Thus, when referring to a shader, or tasks running on a GPU, most types of computation can also be performed.

Execution engines in a GPU contain a general-purpose register file, which is a fast access local storage for intermediate data used by the software that improves performance by avoiding the need to access the main system memory for each computation step. In many GPU architectures, the size of the register file in terms of accessible registers is static and limited by the architecture for the lifetime of a warp. In some cases, the warp may need more or less space than the allocated number of registers. If more registers are needed than are available, the performance of the shader can be degraded. If less space is needed than available, the unused registers are not available to use by other warps executing simultaneously, even if these other warps could benefit from the additional resources. Thus, a method is desired to allow for a dynamic register file reservation that can allocate an amount of register file space that better fits the register file memory needed for the warp and allows the register file resources shared between warps to be utilized more effectively.

BRIEF SUMMARY

A circuit and method for dynamic register allocation for a graphics processing unit is described. A parallel prefix multilayer scanning method to identify positions of bits in order within a binary vector that can be used by the GPU for dynamic register logic is provided. By incorporating various embodiments of the described scanning method, it is possible to provide a dynamic register file allocation that can allocate an amount of register file space that better fits the register file memory needed for a warp and allows the register file resource shared between warps to be utilized more effectively.

A method for dynamic register allocation can include the steps of receiving a binary vector having a length of M bits, the binary vector indicating one or more available blocks of memory in a register file memory; performing a parallel prefix scanning method to identify positions of bits in-order within the binary vector to search for the one or more available blocks of memory in the register file memory and generate an allocation state for a warp; and decoding the allocation state into entries for a lookup table used to generate memory addresses of available blocks of register file memory. In certain embodiments, a dynamic register allocation circuit for a graphics processing unit can perform the method using receiving circuitry to perform the receiving of the binary vector, performing circuitry to perform the parallel prefix scanning, and decoding circuitry to decode the allocation state.

The parallel prefix multilayer scanning method to identify positions of bits in-order within a binary vector can include the steps of scanning the binary vector for high bits in-order by performing a group function on a corresponding group of bits of the binary vector for groups of bits of the binary vector using logic of a parallel prefix tree to produce a group result for each group function performed; combining the group result for each group function to produce a parallel prefix tree output; and combining the parallel prefix tree output with the binary vector to generate the allocation state indicating positions of the high bits in-order.

A parallel prefix circuit can include logic circuitry structured to form a parallel prefix tree that receives an input vector, the logic of the parallel prefix tree performing a plurality of group functions that each calculate a number of high bits of the input vector in-order within a group of bits to produce an output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates a typical computer graphics processing system.

FIG. 5 illustrates an example of a parallel prefix tree.

FIG. 6 illustrates a process flow of a parallel prefix multilayer scanning method in accordance with an embodiment.

FIG. 11 illustrates a process flow for a method for dynamic register allocation in accordance with one embodiment.

DETAILED DESCRIPTION

Figure 2:
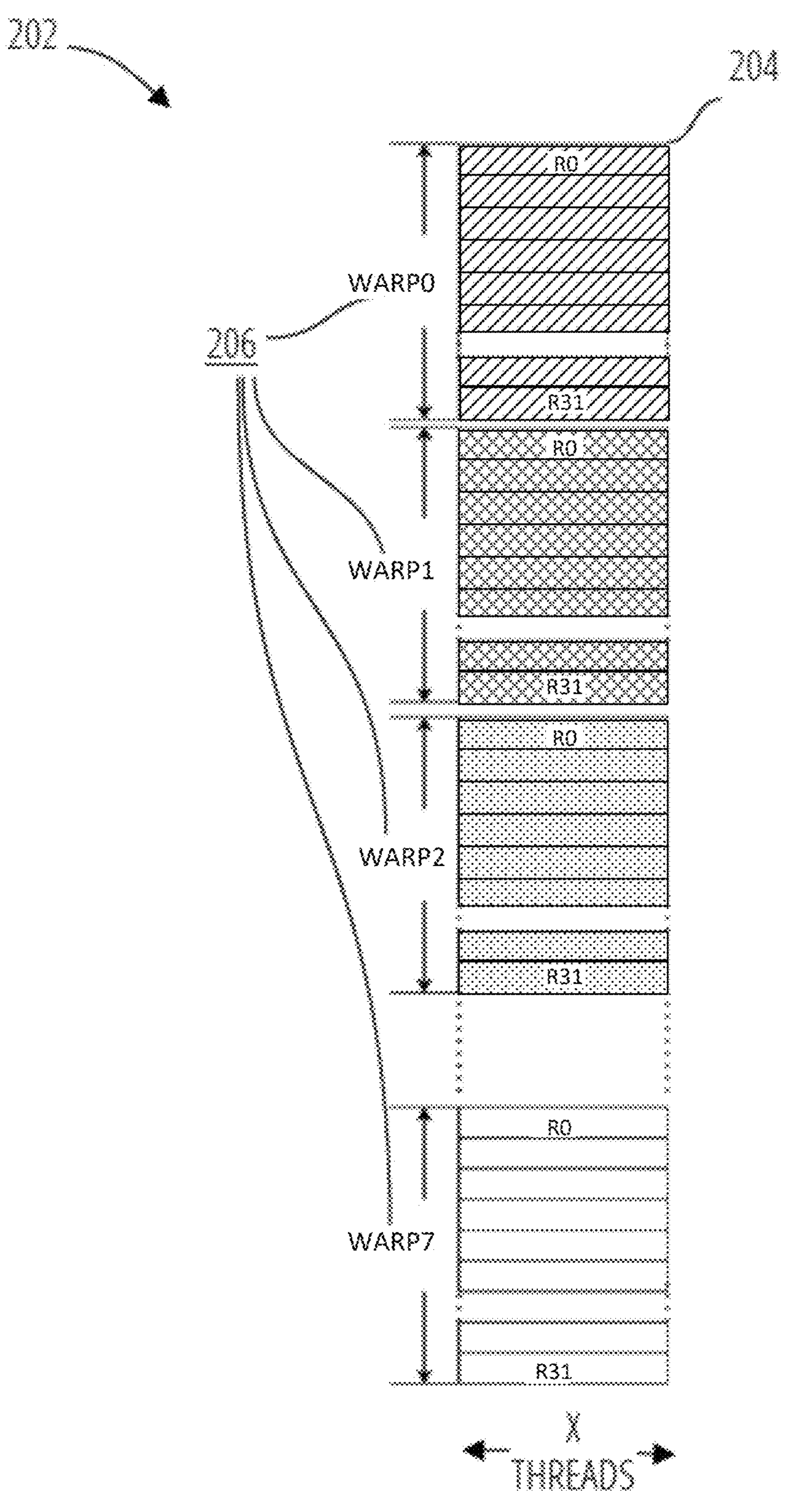
FIG. 2 illustrates a first configuration of a register file memory structure.

A parallel prefix multilayer scanning circuit and method to identify positions of bits in-order within a binary vector that can be used by a GPU for dynamic register logic is provided.

As explained above, in some GPUs, single instruction multiple thread (SIMT) techniques are used to support the parallel execution of the large number of generally synchronized threads. In operation, the GPU may organize the threads into groups. Each group, also known as a warp, is executed simultaneously. High performance can be achieved by executing multiple warps in parallel.

However, the GPU core includes register file memory in which each warp, identified by a warp identification, has a specific region of 32 or 64 registers reserved for it. This static allocation of register file memory for each warp has disadvantages. In some cases, the warp may need more or less space than the allocated number of registers. If more registers are needed than are available, the performance of the shader can be degraded. If less space is needed than available, the unused registers are not available to use by other warps executing simultaneously, even if these other warps could benefit from the additional resources.

Furthermore, to support allocating a variable number of registers for each warp, the hardware and architecture of the GPU needs to support a wider range of minimum and maximum registers and optimally, a finer granularity of sizes to achieve the best balance of performance and efficiency. For example, the GPU can then support 8, 16, 32, 48, 64, etc., registers for each warp. To support such dynamic register allocation in the hardware, an allocation system needs to be able to scan efficiently for multiple available blocks of space inside the GPU's register file. Then, the allocation system can allocate the available blocks to a warp for the duration of its execution and efficiently translate the software's logical register accesses into the physical memory address where the register's data is stored.

In order to do this effectively, the allocation system needs to be able to perform a low-latency scan of the allocation state for currently executing warps and support a low-latency translation of allocated register block positions for each warp into a memory address. As described herein, when performing this scan operation, the allocation system uses a binary vector that indicates free/occupied register blocks in the register file memory to keep track of the allocation state. From the binary vector, the allocation system can then select blocks to allocate for a new warp utilizing allocation logic that produces an encoded vector that indicates allocated register blocks for a new warp.

Advantageously, by incorporating various embodiments of the described scanning method, it is possible to provide a dynamic register file allocation that can allocate an amount of register file space that better fits the register file memory needed for a warp and allows the register file resources shared between warps to be utilized more effectively.

As described in detail herein, parallel prefix multilayer scanning circuits and methods are presented that include parallel prefix principles as found in parallel prefix tree logic to generate position vectors corresponding to the first N high bits in a received binary vector. Thus, the parallel prefix multilayer scanning method is an optimized process to implement the logic needed to search for and decode the first N high positions in a binary vector. This addresses the requirements of efficiently scanning an encoded vector for free register blocks into addresses for each block of registers. Because the scanning method can be performed quickly and efficiently, it can be utilized for dynamic register file allocation in the register file memory and corresponding address decoding for a microprocessor such as a GPU, for example, where efficiency and performance are important.

FIG. 1 illustrates a typical computer graphics processing system. Graphics processing system 100 includes a host processor, e.g., CPU 102, a graphics processing unit e.g., GPU 104, and memory 106. An application 108, such as a game, executing on the CPU 102, will require graphics processing operations to be performed by an associated GPU 104 that executes graphics processing. To do this, the application 108 will generate API (Application Processing Interface) calls that are interpreted by a driver 110 for the GPU 104 that is running on the CPU 102 to generate appropriate commands to the GPU 104 to generate graphics output required by the application 108. To facilitate this, a set of commands will be provided to the GPU 104 in response to commands from the application 108 running on the CPU 102 for graphics output, e.g., to generate a frame to be displayed. The graphics processing system 100 will also include memory 106 for use by both the CPU 102 and GPU 104.

FIG. 2 illustrates a first configuration of a register file memory structure indicating where information is stored in the register file memory. FIG. 2 illustrates a first configuration 202 of register file memory 204. Register file memory 204 can be in the form of RAM. The register file memory 204 is organized in register blocks, referred to as warp slots 206, each warp slot 206 is reserved for a warp, shown in FIG. 2 as WARP 0, WARP 1, etc. In the first configuration 202 of register file memory 204, warp slot 206, e.g., WARP 0, includes 32 registers. In some cases (not shown), warp slot 206, e.g., WARP 0, can include 64 contiguous registers. The width of each register contains a number of x threads.

When using the static allocation scheme, as illustrated in FIG. 2, there can be disadvantages. For example, in some cases, a user defined program run on the GPU, such as a shader, may need more than space than the allocated 32 or 64 registers, for example, which is currently not allowed. In this case, when more registers are needed for the generated warps and only one warp containing 32 registers, for example, is allocated, the extra work will spill to memory 106 and result in performance loss instead of utilizing quick access register file memory in the GPU. The performance of the application can then be degraded. In other cases, when the user defined program needs less space than the 32 registers allocated, a reserved area of unused registers results and the relevant memory is wasted.

In a dynamic organization of the register file memory, the range of registers (e.g., the minimum and maximum number of addressable registers) can be expanded. For example, in some implementations, the range of registers can start from 16 and go up to 256 registers. This expansion of usable registers available for a warp adds a finer granularity making it possible to allocate 16, 32, 48, 64, . . . , 128 registers for the warp.

Figure 3:
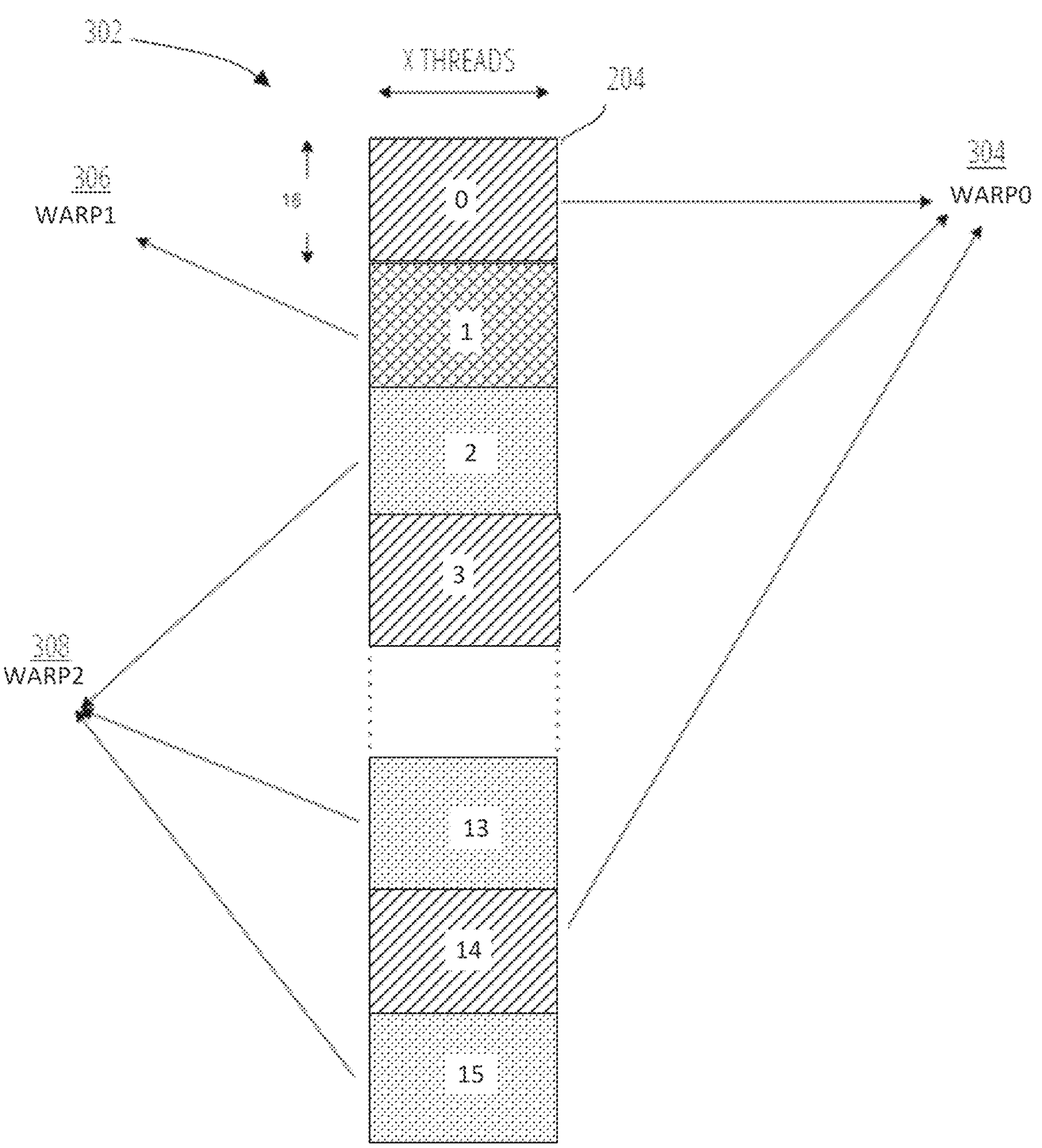
FIG. 3 illustrates a second configuration of a register file memory structure.

With the expansion of usable registers available for a warp, the warp slot identification can be decoupled from the memory allocation in the register file memory. Thus, a warp can reserve any number of register blocks that do not have to be contiguous. For example, FIG. 3 illustrates a second configuration of a register file memory structure. The second configuration 302 of register file memory 204 shows a first warp slot 304, e.g., WARP 0, including non-contiguous blocks of registers in blocks 0, 3, and 14, a second warp slot 306, e.g., WARP 1, including only register block 1, and a third warp slot 308, e.g., WARP 2, including non-contiguous register blocks 2, 13, and 15.

Figure 4:
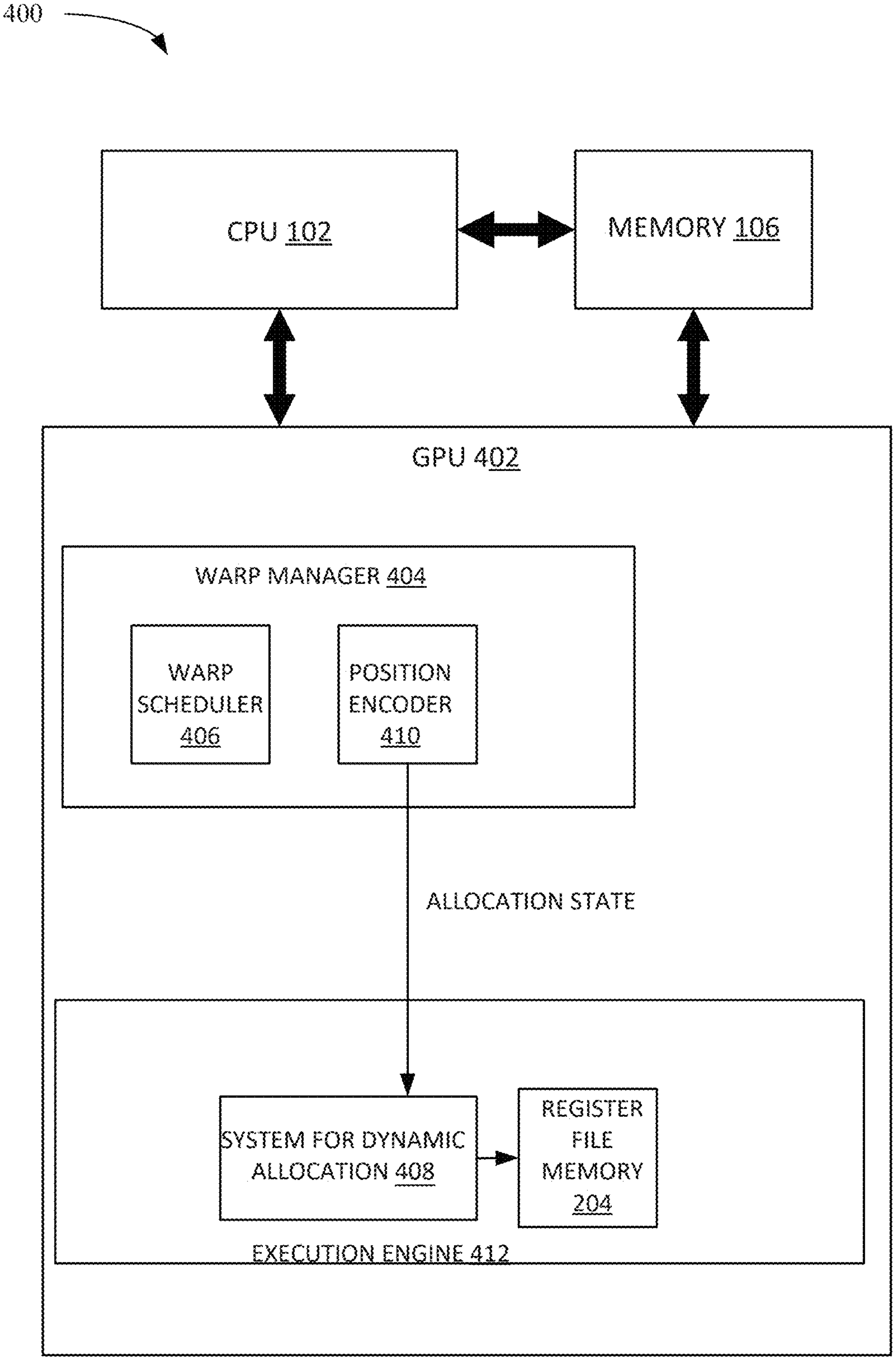
FIG. 4 illustrates an operating environment for a system for dynamic register allocation.

FIG. 4 illustrates an operating environment of a system for dynamic register allocation. Like FIG. 1, operating environment 400 includes CPU 102, GPU 402, and memory 106. GPU 402 includes warp manager 404 that includes a warp scheduler 406 and position encoder 410. GPU 402 comprises an execution engine 412 that includes a system for dynamic allocation 408 and a register file memory 204. Task scheduling is communicated by the CPU 102 to the warp manager 404 of the GPU 402. In the warp manager 404, a warp is scheduled by the warp scheduler 406. The warp scheduler 406 is responsible for selecting which warp will execute on the GPU 402 processor at any given time. When a warp needs to be created, position encoder 410 outputs an allocation state in the form of a binary vector. The allocation state is then transmitted to the execution engine 412 together with a 'create' request to create the warp.

In order to be able to support dynamic register allocation in the GPU 402, the system for dynamic allocation 408 needs to be able to scan efficiently for multiple blocks inside the register file memory 204 of the GPU 402 to reserve and then decode the reserved blocks efficiently into a translation table embodied as a lookup table per warp slot identification.

Position encoder 410 and an allocation state decoder 902 (see FIG. 9) within the system for dynamic allocation 408 can both be implemented in hardware utilizing parallel prefix logic within the GPU 402. The position encoder 410 scans for multiple available blocks inside the register file memory 204 to allocate and encodes a binary vector indicating available register blocks. The binary vector is provided to the allocation state decoder 902 as an allocation state of the register file memory 204. In some cases, the allocation state can be a bitmask that indicates the free/occupied register blocks in register file memory 204. The position encoder 410 and the allocation state decoder 902 can include logic implemented in hardware by circuitry based on parallel prefix tree logic that includes group functions. In order to dynamically reserve register blocks in register file memory 204, the allocation state decoder 902 is introduced that can decouple the warp slot identification with the register file allocation as discussed with reference to FIG. 3. The allocation state decoder 902 performs the decoupling of the warp slot identification with the register file allocation by translating the warp slot identification in the received allocation state to a register file memory address.

Parallel prefix trees utilize group functions performed in parallel for efficient and quick calculations. When certain operations are performed in hardware, utilizing parallel prefix trees can help to avoid long latency and decreased performance associated with long dependencies, especially for processing a large number of interdependent results (bits). For example, a Sklansky tree performs addition of groups of bits in parallel. FIG. 5 illustrates an example of a parallel prefix tree. In the parallel prefix tree 500 shown, e.g., Sklansky tree, the group functions 502, shown as rectangles in FIG. 5, include adders. While a Sklansky tree is shown, it is for exemplary purposes only, other parallel prefix trees may be used in the proposed methods with defined group functions.

The system for dynamic allocation 408 needs to be able to perform a low-latency scan of the allocation state for currently executing warps and support a low-latency translation of allocated register block positions for each warp into a memory address. Frequently, in digital hardware, each bit of an operation such as summation, depends not only on bits of the input, but on the previous bit of the output as well. In these cases, as the length grows, the logic states and associated delay increase linearly with the length of the output N, significantly reducing the achievable frequency of the circuit, or requiring pipelining which will significantly increase the latency to result and can have a strong impact on performance. Performing dynamic register allocation in the register file involves such a problem, e.g., searching for high bits and their position within a binary vector which in the case of dynamic register allocation indicates the index of a register block to be allocated to a new warp. Thus, a parallel prefix multilayer scanning method is presented.

FIG. 6 illustrates a process flow of the parallel prefix multilayer scanning method in accordance with one embodiment. The method can be performed by parallel prefix circuitry including hardware performing logical operations. The method 600 receives a binary vector and outputs an encoded vector indicating positions of the high bits of the binary vector in-order. In particular, the received binary vector is scanned for the position of the first N bits that are high, e.g., set to a logical 1, in the correct order (from least significant to most significant) where N can be set to the maximum desired positions to search for. Method 600 can be carried out by the allocation state decoder 902 as described with respect to FIG. 4 and FIG. 9.

Method 600 receives (602) a binary vector having a length of M bits. The binary vector is received and can be arbitrarily long having M bits. In some cases, the binary vector can be the allocation state as seen in FIG. 4 and received from position encoder 410. In some cases, the length of M bits is in a range of 16-64 bits. When the binary vector is the allocation state as shown in FIG. 4, each bit represents a register block within the register file memory 204 and its value set to a one indicates it is available to be allocated to a newly created warp.

Method 600 further scans (604) the binary vector for high bits in-order by performing a group function on a corresponding group of bits of the binary vector for groups of bits of the binary vector using logic of a parallel prefix tree to produce a group result for each group function performed. In some cases, the group function can be defined as calculating exactly 0 or exactly 1 bits in the group of bits.

In order to find the position of the first N bits that are high, a prefix calculation includes calculating the number of high bits in progressively larger groups of bits, starting from a group of 1-bit. A preliminary calculation includes finding input values of exactly 0 bits and exactly 1 bit high in a range of 1. For EX0 (exactly 0) and EX1 (exactly 1) bit high in a range of 1, the bit of the input binary vector is used as it is for the exactly 1-bit high case and inverted for the exactly 0-bit high case. The preliminary calculations are defined by the group functions, $EX0_{i:i}=\sim A[i]$, $EX1_{i:i}=A[i]$, where A is the received binary vector and can be written as $A=\{a0, a1, \ldots, an-1\}$. The calculations for the higher counts are 0.

After the preliminary calculation is complete, the number of high bits is calculated in successively larger groups similar to how carry look-ahead and other parallel prefix tree adders work. The prefix calculation can be written as the calculation of $\{a_0, (a_0 \oplus a_1), (a_0 \oplus a1 \oplus a2) \ldots \}$. The prefix calculation is performed utilizing the parallel prefix tree such that the operations in the parentheses are performed in parallel. A range of bits i:j can be broken down at any arbitrary intermediate point k into smaller ranges i:k and k−1:j. This allows results from the smaller ranges in previous computation to be re-used to compute the result for the larger group i:j. For example, $EX0_{i:j}=EX0_{i:k}*EX0_{k-1:j}$. Thus, all the bits of the received binary vector, e.g., the range of bits i:j, can be distributed into successively larger groups of bits in a way that trades off performance and area. For example, referring back to FIG. 5, at the same horizontal layer in the parallel prefix tree 500, e.g., Sklansky tree, group functions 502 are performed on smaller groups simultaneously.

The group functions 502 can each be defined according to equations comprising Boolean expressions to find exactly n high bits in a range between i:j. The equations can be expressed as:

$$EX1_{i:j} = EX1_{i:k} \text{ AND } EX0_{k:j} \text{ OR } EX0_{i:k} \text{ AND } EX1_{k:j}. \tag{1}$$

$$EX0_{i:j} = EX0_{i:k} \text{ AND } EX0_{k:j}. \tag{2}$$

$$EX2_{i:j} = EX2_{i:k} \text{ AND } EX0_{k:j} \text{ OR } EX1_{i:k} \text{ AND } EX1_{k:j} \text{ OR } EX0_{i:k} \text{ AND } EX2_{k:j} \text{ and so on.} \tag{3}$$

Figure 7A:
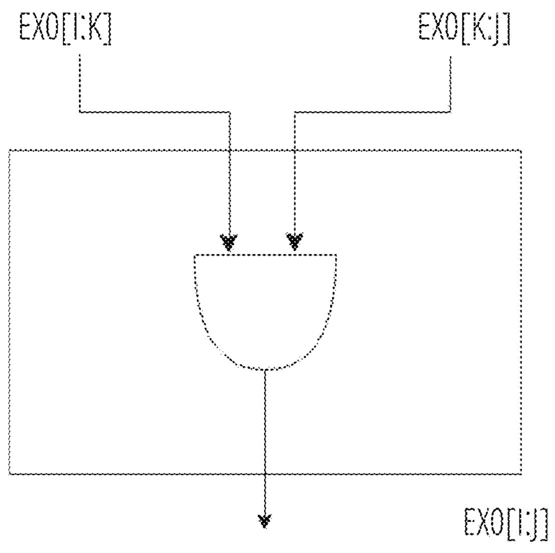
FIG. 7A illustrates a first group function.
Figure 7B:
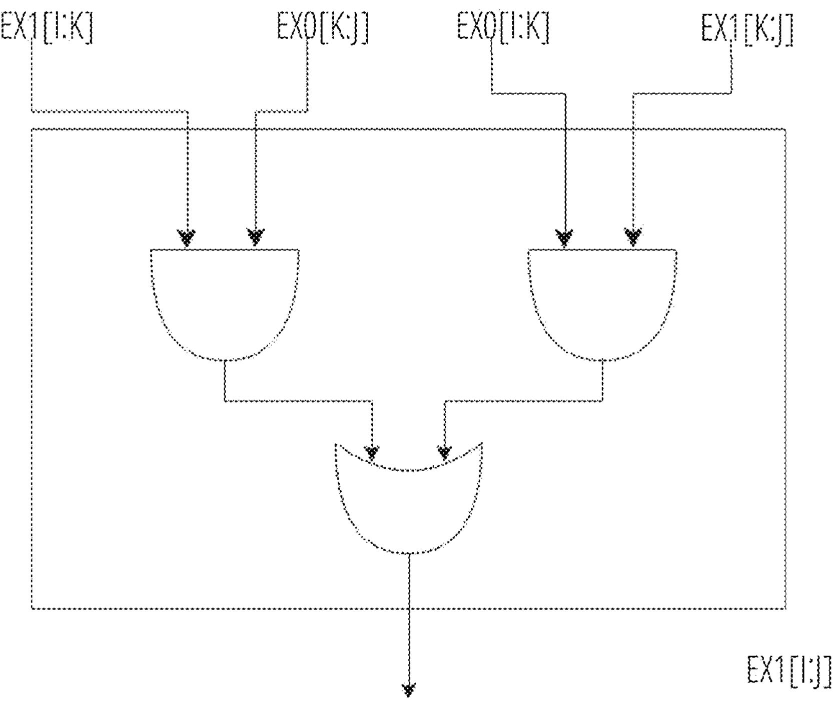
FIG. 7B illustrates a second group function.
Figures 7C, 7D:
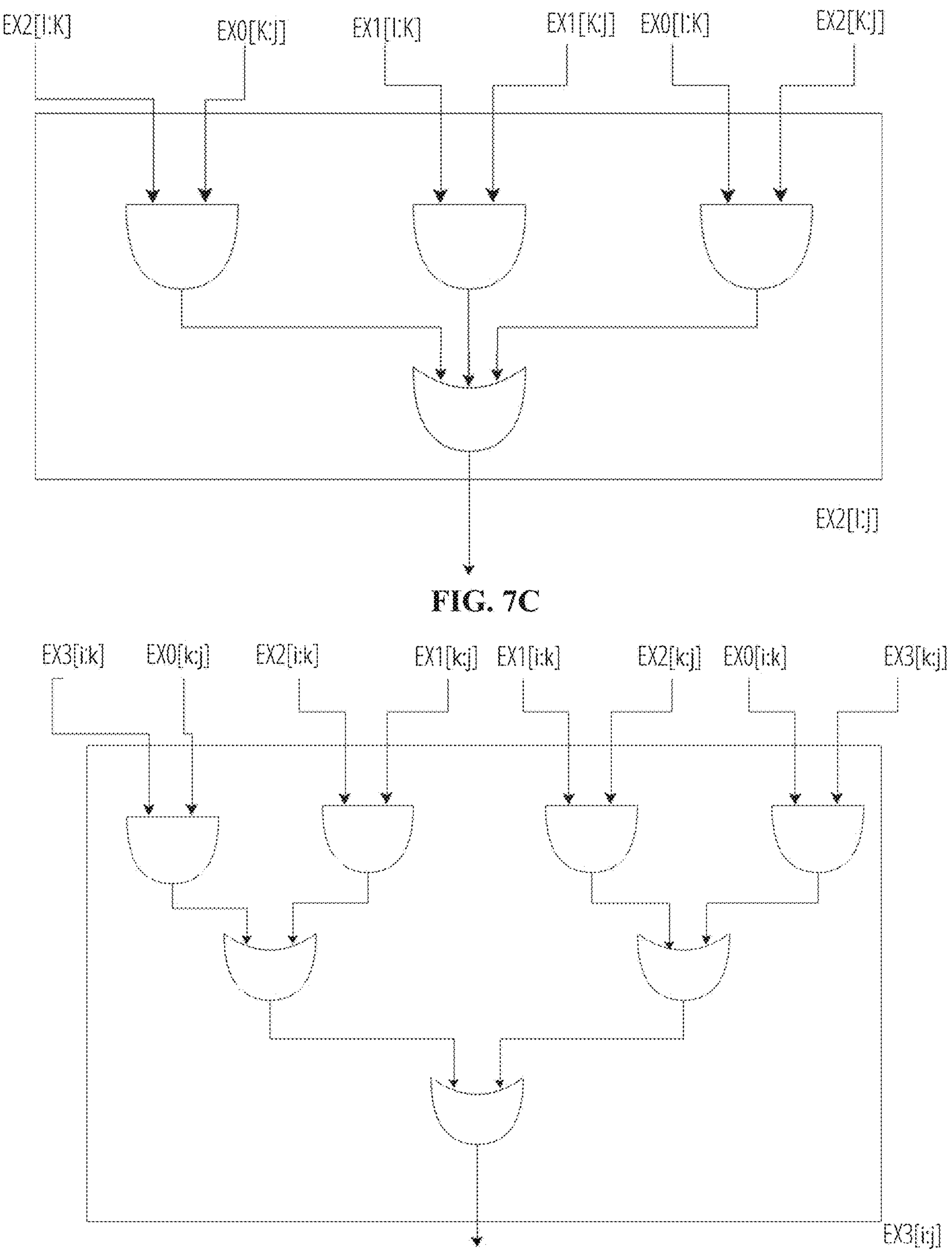
FIG. 7C illustrates a third group function.
FIG. 7D illustrates a fourth group function.

The group functions 502, as expressed in computer logic, corresponding to a binary vector having a range of i:j bits can be seen in FIG. 7A, FIG. 7B, FIG. 7C and FIG. 7D respectively. For example, FIG. 7A, illustrates the calculation for finding exactly 0 (EX0) bits in the range of i:j bits. Corresponding to the equation (2) shown above, exactly 0 bits in the range of i:j bits can be found by a logical AND of $EX0_{i:k}$ and $EX1_{k:j}$. Similarly, FIG. 7B illustrates the calculation for finding exactly 1 (EX1) bit in the range of i:j bits. Corresponding to the equation (1) shown above, EX1 bits in the range of i:j bits can be found by performing a logical AND of $EX1_{i:k}$ and $EX0_{k:j}$ as well as performing a logical AND of EX0i:k and $EX1_{k:j}$. The results of the logical AND operations are used as inputs to an OR gate. After the inputs are ORed together, the result is $EX1_{i:j}$. FIG. 7C illustrates the calculation for finding exactly 2 (EX2) bits in the range of i:j bits. Corresponding to the equation (3) shown above, EX2 bits in the range of i:j bits can be found by performing a logical AND of $EX2_{i:k}$ and $EX0_{k:j}$, performing a logical AND of $EX1_{i:k}$ and $EX1_{k:j}$, and performing a logical AND of $EX0_{i:k}$ and $EX2_{k:j}$. The results of the logical AND operations are used as inputs to an OR gate. After the inputs are ORed together, the result is $EX2_{i:j}$. Similarly, to the calculations above, FIG. 7D illustrates the calculation for finding exactly 3 (EX3) bits in the range of i:j bits.

The calculations according to the group functions described above can be organized in a parallel prefix tree. The parallel prefix tree utilizes the group functions of each group function comprising a Boolean expression that calculates a number of high bits in a group of bits. For each group function performed, the calculation produces a group result.

Method 600 further includes combining (606) the group results for the range i:j indicating the bit ranges that fulfill the criteria of containing a precise number of high bits to produce a parallel prefix tree output.

Figure 8:
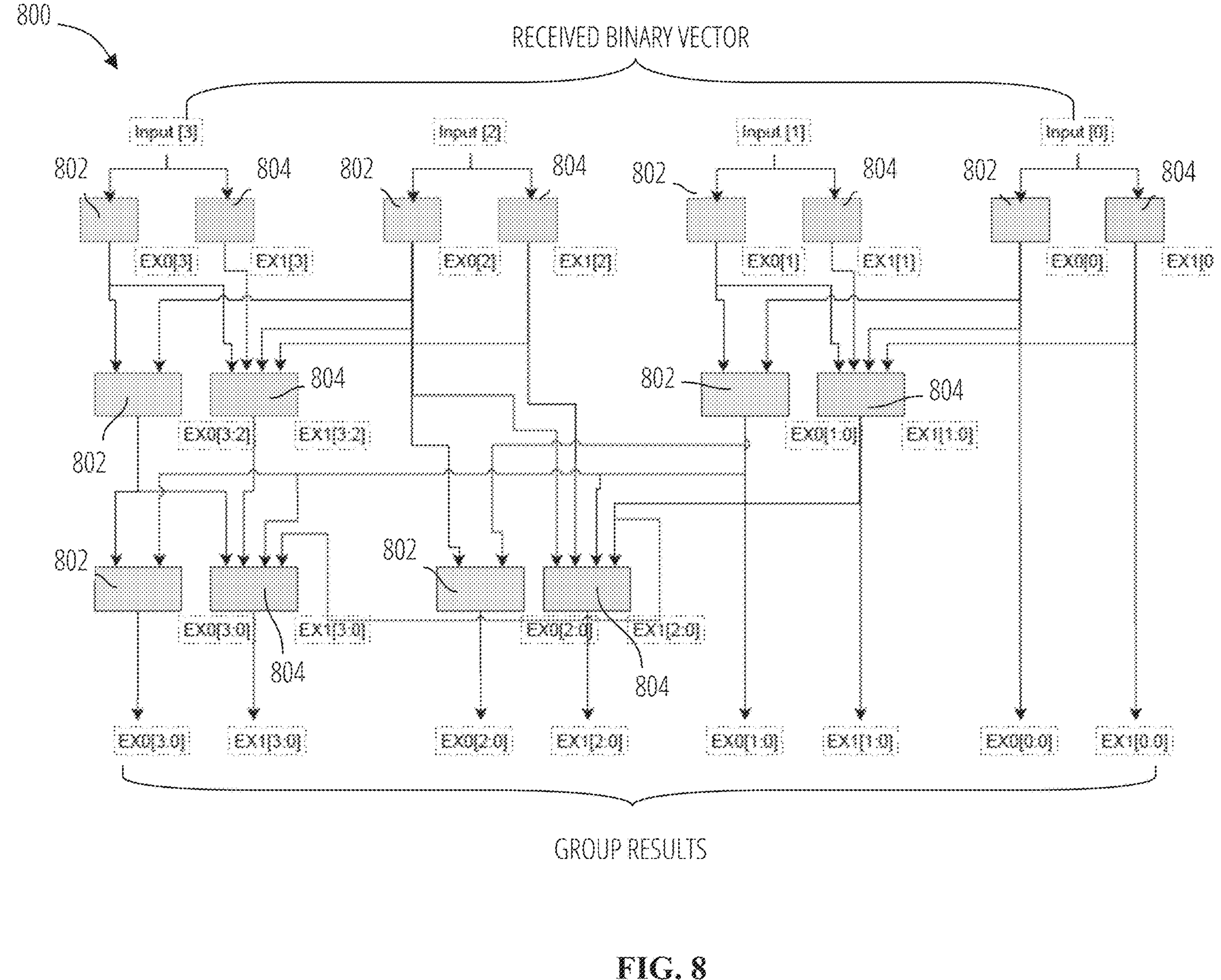
FIG. 8 illustrates a simple example of parallel prefix tree circuitry that include the group functions of FIG. 7A-FIG. 7B.

For example, FIG. 8 illustrates a simple example of parallel prefix tree circuitry that includes the group functions of FIG. 7A-FIG. 7B. In the example, the parallel prefix tree 800 performs group functions, $EX0_{i:j}$ 802 and $EX1_{i:j}$ 804, on a received binary vector of 4 bits (bits shown in FIG. 8 as Input [0], Input [1], Input [2], and Input [3]) layer by layer starting at the top horizontal layer such that the calculations performed in each layer are completed in parallel. After the calculations in the last layer are performed, a plurality of group results (shown as EX0[3:0], EX 1[3:0], EX0 [2:0], EX0[1:0], EX0[0:0], and EX1[0:0]) are obtained.

Method further includes combining (608) the parallel prefix tree output with the binary vector to generate an encoded vector indicating positions of the high bits in-order In some cases, the parallel prefix tree output, e.g., the combined group results, is combined with the received binary vector utilizing a bitwise logical AND to obtain the encoded vector containing the in-order position of the first N high bits. In some cases, the encoded vector can be multiple encoded vectors and the parallel prefix tree output can be multiple parallel prefix tree outputs.

For example, to find the first high-bit position for a binary vector with a length of M=4, the following equation (4) can be used:

$$\text{location\_of\_first\_high\_bit} = \{EX0_{2:0} \,\&\, A[3], EX0_{1:0} \,\&\, A[2], EX0_{0:0} \,\&\, A[1], A[0]\} \tag{4}$$

Besides the exactly 0 and exactly 1 group functions, group functions are also composed for the higher count cases which are then used to find the second third fourth and so on high bits in the vector. By balancing different parallel prefix tree designs and group sizes, area can be traded off to lower latency to fit within a pipeline cycle. The group functions can also be written such that the product of the lower-count tree, e.g., EX0, can be incorporated into the logic calculating higher count groups, so that the area is progressively smaller with a slightly higher logical depth. See for example, equation (3).

In some cases, if a single cycle latency is not needed, by trading off area and performance, a smaller number of parallel prefix tree outputs can be selected utilizing the logic, e.g., N=4, and then the parallel prefix tree outputs can be combined with the input binary vector to create a masked version with the 4 first high bits set to 0. The masked version of the input binary vector can be processed through the same logic to find the subsequent 4 positions and so on. Other numbers of N and number of execution cycles can be selected.

As can be seen, a parallel prefix circuit can include logic circuitry structured to form a parallel prefix tree that receives an input vector, the logic of the parallel prefix tree performing a plurality of group functions that each calculate a number of high bits of the input vector in-order within a group of bits to produce an output. The logic circuitry can be formed, for example, of various combinatorial logic, including AND gates and OR gates. As further described herein, the output can be structured to be combined with the input and processed over subsequent cycles of execution.

Figure 9:
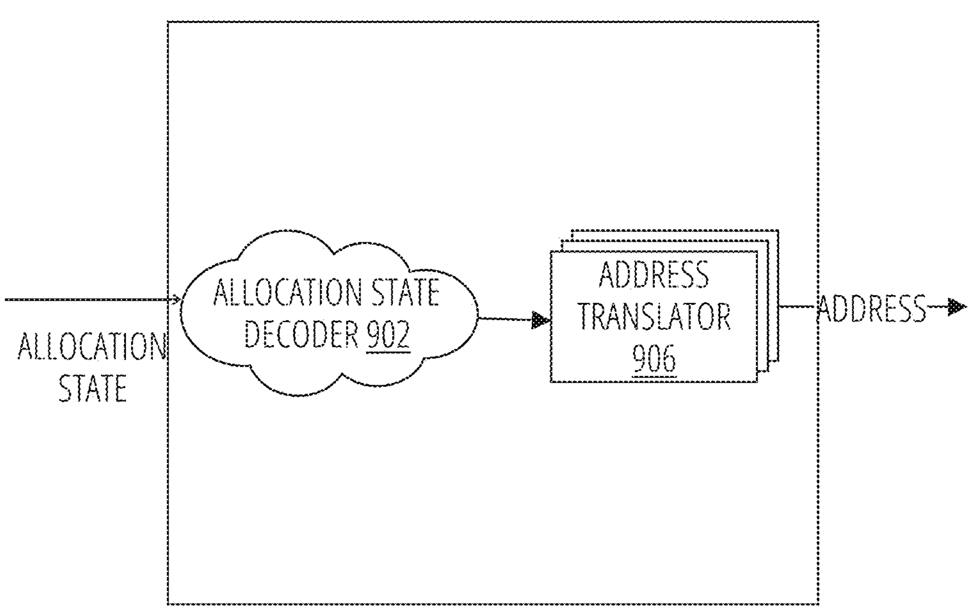
FIG. 9 illustrates a schematic diagram of a system for dynamic memory allocation.

FIG. 9 illustrates a schematic diagram of the system for dynamic memory allocation. Referring to FIG. 9, the system for dynamic allocation 408 includes the allocation state decoder 902 and address translator 906.

As described previously with reference to FIG. 4, position encoder 410 outputs a binary vector that can be used to describe an allocation state indicating the available register blocks to reserve within register file memory 204. The allocation state can be communicated as a bitmask with each bit representing a register block within the register file memory 204 and its value set to a one indicates that it is available to be allocated to a newly created warp. For example, a bitmask of 0001010 can be communicated as an allocation state indicating that register blocks 1 and 3, e.g., the high bits of the bitmask, can be allocated for a warp in register file memory 204.

The allocation state is input into the allocation state decoder 902. The allocation state decoder 902 decodes the first N positions of the allocation state combinatorially (e.g., using combinatorial logic of the logic circuitry). For each position of the first N positions, a next value(s), e.g., entry, is generated in a lookup table. The value of N is variable and depends on the processor utilizing the parallel prefix circuitry. There can be one lookup table per warp. The allocation state decoder 902 includes translation logic implemented in hardware that decodes the bitmask as described above with respect to FIGS. 3-6.

For example, the allocation state decoder 902 scans the received bitmask for the position of the first N bits that are high, e.g., set to a logical 1, in the correct order (from least significant to most significant) where N can be set to the maximum desired positions to search for. The high bits in the bitmask can correspond to available blocks in the register memory file that can be reserved, for example. The scanning includes performing a group function on a group of bits of the binary vector for all the bits in the received binary vector using logic of a parallel prefix tree to produce a group result for each group function performed. The group results for each group function are then combined to produce a parallel prefix tree output. The parallel prefix tree output is combined, e.g., through a bitwise AND, with the allocation state to generate an encoded vector indicating positions of the high bits in-order.

The allocation state decoder 902 then decodes the encoded vector into entries for a lookup table used to generate memory addresses of available blocks of register file memory. For each warp, the allocation state decoder 902 directly generates the next value of the first N lookup table entries. The decoding includes populating the lookup table with a decoded value from least significant starting at lookup table row 0 up to lookup table row N−1. Each decoded value indicating a base address for a register block determined by the location of a high bit in the encoded vector. In some cases, the decoding is performed in two or more cycles of execution by combining the decoded value for the first N entries with the binary vector to produce an output and processing the output in subsequent cycles.

Address translator 906 provides address translation on the register access to a memory address in the register file memory 204. The address translator 906 utilizes the lookup table 1002 that was populated by the allocation state decoder 902 to accomplish the translation. Each warp includes a lookup table 1002 to allow for fast and efficient address lookup. The entries in the lookup table 1002 are translated into a memory address within the register file memory 204. The memory address in the register file memory 204 is composed of the base address of a register block (corresponding to an entry in the lookup table) appended to a register position of a particular register in that register block. The lookup table 1002 is created upon the warp creation, e.g., when the allocation state decoder 902 receives the allocation state.

Figure 10:
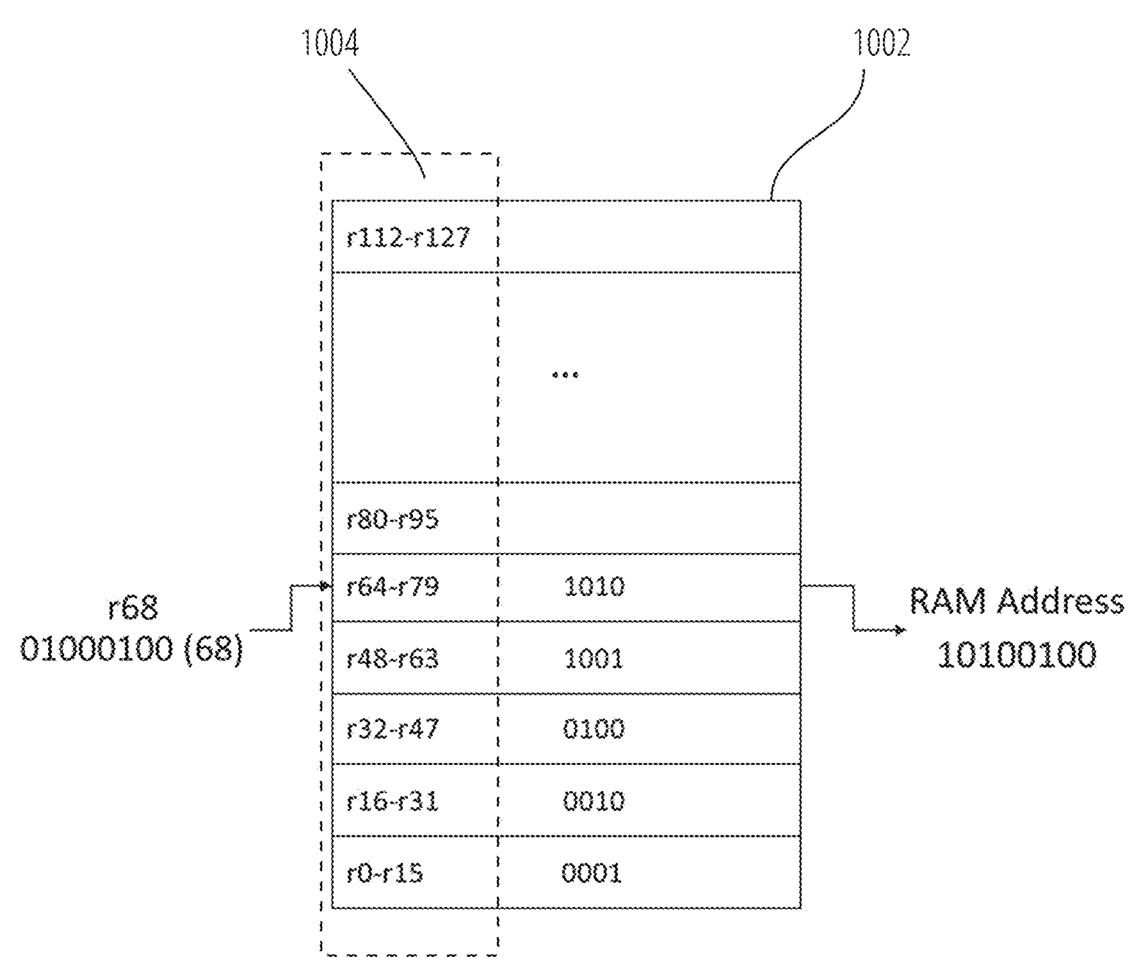
FIG. 10 illustrates a representational depiction of address translation using a look up table.

FIG. 10 illustrates a representational depiction of address translation using a lookup table. Lookup table 1002 is utilized in the system for dynamic allocation 408 by the address translator 906. Lookup table 1002 comprises register blocks 1004, each register block 1004 including a corresponding row in the lookup table 1002. Each register block comprises a block of registers, such as for example, 16 registers in each register block as shown in FIG. 10. An example of the address translation can be seen in FIG. 10. The lookup table 1002 includes entries for register blocks 1004 that give the base address for those register blocks 1004 in register file memory 204. Thus, r68 is in the $5^{th}$ register block 1004 counting from 0. The base address found as the entry in the $5^{th}$ register block is 1010. Then, the register position of the particular register, e.g., 68 in this example, in that register block is used to derive the remaining portion of the memory address in the register file memory 204. As 68 is the $5^{th}$ register in the row (64+4=68), the register position of the particular register is 4 or 0100.

FIG. 11 illustrates a process flow for a method for dynamic register allocation in accordance with one embodiment. Method 1100 can be carried out by the system for dynamic allocation 408 as described with respect to FIG. 4. Method 1100 utilizes the parallel prefix scanning method 600 as described previously to identify positions of bits in-order within the binary vector received as the allocation state. The parallel prefix scanning method is implemented in the hardware found in allocation state decoder 902. Thus, method 1100 includes the steps of receiving (1102) a binary vector having a length of M bits, the binary vector indicating one or more available blocks of memory in a register file memory and performing (1104) the parallel prefix scanning method to identify positions of high bits in-order with the binary vector to search for the one or more available blocks of memory in the register file memory and generate an allocation state for a warp. Method 1100 further includes decoding (1106) the allocation state into entries for a lookup table used to generate memory addresses of available blocks of register file memory.

In summary, the parallel prefix multilayer scanning method allows an efficient generation of the first N positions of high bits in-order within a binary vector combinatorially. This method can be utilized in many different applications. For example, the position encoder inside the warp manager can utilize the scanning and combining step of the method after receiving binary vector to scan for the high bits in the binary vector. Dynamic register allocation as discussed with respect to the system for dynamic allocation and the corresponding method utilizes the parallel prefix multilayer scanning method to perform a low latency search for the high bits in-order in the allocation state. The allocation state is then decoded from one representation to another in the translation logic of the allocation state decoder. The bitmask of the allocation state indicates which register blocks belong to the newly created warp within the register file memory.

Certain embodiments of the illustrated methods and circuitry include the following.

Clause 1. A method for dynamic register allocation for a graphics processing unit, comprising: receiving a binary vector having a length of M bits, the binary vector indicating one or more available blocks of memory in a register file memory; performing a parallel prefix scanning method to identify positions of high bits in-order within the binary vector to search for the one or more available blocks of memory in the register file memory and generate an allocation state for a warp; and decoding the allocation state into entries for a lookup table used to generate memory addresses of available blocks of register file memory.

Clause 2. The method of clause 1, wherein performing the parallel prefix scanning method to identify positions of high bits in-order with the binary vector comprises: scanning the binary vector for high bits in order by performing a group function on a corresponding group of bits of the binary vector for groups of bits of the binary vector using logic of a parallel prefix tree to produce a group result for each group function performed, combining the group result for each group function to produce a parallel prefix tree output, and combining the parallel prefix tree output with the binary vector to generate the allocation state indicating positions of the high bits in-order.

Clause 3. The method of clause 2, wherein performing a group function on a corresponding group of bits of the binary vector for groups of bits includes the steps of: performing calculations on the received binary vector to obtain a vector including a calculation of exactly 0 and exactly 1 (EX0, EX1) bits high for a single bit group, for all the bits of the binary vector; distributing all of the bits of the binary vector into groups of bits; and calculating group functions on the groups of bits to produce corresponding group results, each group result including a number of high bits in the corresponding group of bits.

Clause 4. The method of clause 2, wherein performing a group function on a corresponding group of bits of the binary vector for groups of bits includes the steps of: performing calculations on the received binary vector to obtain a vector including a calculation of exactly 0, exactly 1, exactly 2, and exactly 3 (EX0, EX1, EX 2, EX3) bits high for a single bit group, for all the bits of the binary vector; distributing all of the bits of the binary vector into groups of bits; and calculating group functions on the groups of bits to produce corresponding group results, each group result including a number of high bits in the corresponding group of bits.

Clause 5. The method of clause 2, wherein combining the parallel prefix tree output with the binary vector comprises utilizing a bitwise AND.

Clause 6. The method of any preceding clause, wherein the allocation state is a bitmask comprising an encoded vector indicating positions of high bits in-order within the bitmask from least significant to most significant.

Clause 7. The method of clause 6, wherein decoding the allocation state into entries for the lookup table comprises populating the lookup table with a decoded value indicating a base address for a register block determined by the location of a high bit in the encoded vector from least significant to most significant starting at a lookup table row 0 up to row N−1.

Clause 8. The method of clause 7, wherein the decoding is performed when the warp is created.

Clause 9. The method of clause 7, wherein the decoding is performed in two or more cycles of execution by combining the decoded value for a first N entries with the binary vector to produce an output and processing the output in subsequent cycles.

Clause 10. The method of clause 7, further comprising translating the entries within the lookup table into a memory address within the register file memory.

Clause 11. The method of clause 10, wherein translating the entries with the lookup table into the memory address includes composing the memory address from the base address of the register block appended to a register position of a particular register in that register block.

Clause 12. The method of any preceding clause, wherein the method is performed in one cycle of execution when the warp is created.

Clause 13. The method of any preceding clause, wherein the length of M bits is in a range of 16-64 bits.

Clause 14. The method of clause 2, wherein each group function includes a Boolean expression implemented with logical operators to calculate a number of high bits in the group of bits.

Clause 15. The method of clause 2, wherein the parallel prefix tree is a Sklansky tree.

Clause 16. A parallel prefix circuit, comprising: logic circuitry structured to form a parallel prefix tree that receives an input vector, the logic of the parallel prefix tree performing a plurality of group functions that each calculate a number of high bits of the input vector in-order within a group of bits to produce an output.

Clause 17. The parallel prefix circuit of clause 16, wherein the plurality of group functions each include an equation including Boolean expressions implemented by logical operators to calculate a number of high bits in the group of bits.

Clause 18. The parallel prefix circuit of clause 16 or 17, wherein the output is combined with the input and processed over subsequent cycles of execution.

Clause 19. A parallel prefix circuit for identifying positions of high bits in-order within a binary vector, the parallel prefix circuit comprising: receiving circuitry to receive a binary vector having a length of M bits; scanning circuitry to scan the binary vector for high bits in-order by performing a group function on a corresponding group of bits of the binary vector for groups of bits of the binary vector using logic of a parallel prefix tree to produce a group result for each group function performed; combining circuitry to combine the group result for each group function to produce a parallel prefix tree output; and encoded vector generation circuitry to combine the parallel prefix tree output with the binary vector to generate an encoded vector indicating positions of the high bits in-order within the binary vector.

Clause 20. A dynamic register allocation circuit for a graphics processing unit, comprising: receiving circuitry for receiving a binary vector having a length of M bits, the binary vector indicating one or more available blocks of memory in a register file memory; searching circuitry to search the binary vector for N available blocks of memory from the one or more available blocks of memory in the register file memory to generate an allocation state for a warp; and decoding circuitry to decode the allocation state into entries for a lookup table used to generate memory addresses of available blocks of register file memory.

Clause 21. The dynamic register allocation circuit of clause 20, wherein the searching circuitry includes the parallel prefix circuit of clause 19.

Although the subject matter has been described in language specific to structural features and/or acts, it is to be understood that the subject matter defined in the appended claims is not necessarily limited to the specific features or acts described above. Rather, the specific features and acts described above are disclosed as examples, implementing the claims and other equivalent features and acts; they are intended to be within the scope of the claims.

What is claimed is:

1. A dynamic register allocation circuit for a graphics processing unit, comprising:

receiving circuitry for receiving a binary vector having a length of M bits, the binary vector indicating one or more available blocks of memory in a register file memory;

performing circuitry to perform a parallel prefix scanning method to identify positions of high bits in-order within the binary vector to search for the one or more available blocks of memory in the register file memory and generate an allocation state for a warp; and decoding circuitry to decode the allocation state into entries for a lookup table used to generate memory addresses of available blocks of register file memory.

2. The dynamic register allocation circuit of claim 1, further comprising:

searching circuitry to search the binary vector for N available blocks of memory from the one or more available blocks of memory in the register file memory to generate an allocation state for a warp.

3. The dynamic register allocation circuit of claim 1, wherein the allocation state is a bitmask comprising an encoded vector indicating positions of high bits in-order within the bitmask from least significant to most significant.

4. The dynamic register allocation circuit of claim 1, wherein the length of M bits is in a range of 16-64 bits.

5. The dynamic register allocation circuit of claim 1, wherein the performing circuitry comprises:

scanning circuitry to scan the binary vector for high bits in-order by performing group functions on a corresponding group of bits of the binary vector for groups of bits in the binary vector using logic of a parallel prefix tree to produce a group result for each group function performed;

combining circuitry to combine the group result for each group function to produce a parallel prefix tree output; and encoded vector generation circuitry to combine the parallel prefix tree output with the binary vector to generate an encoded vector indicating positions of the high bits in-order with the binary vector.

6. The dynamic register allocation circuit of claim 5, wherein each group function includes a Boolean expression implemented with logical operators to calculate a number of high bits in the group of bits.

7. The dynamic register allocation circuit of claim 5, wherein the parallel prefix tree is a Sklansky tree.

8. A method for dynamic register allocation for a graphics processing unit, comprising:

receiving a binary vector having a length of M bits, the binary vector indicating one or more available blocks of memory in a register file memory;

performing a parallel prefix scanning method to identify positions of high bits in-order within the binary vector to search for the one or more available blocks of memory in the register file memory and generate an allocation state for a warp; and decoding the allocation state into entries for a lookup table used to generate memory addresses of available blocks of register file memory.

9. The method of claim 8, wherein performing the parallel prefix scanning method to identify positions of high bits in-order with the binary vector comprises:

scanning the binary vector for high bits in order by performing a group function on a corresponding group of bits of the binary vector for groups of bits of the binary vector using logic of a parallel prefix tree to produce a group result for each group function performed, combining the group result for each group function to produce a parallel prefix tree output, and combining the parallel prefix tree output with the binary vector to generate the allocation state indicating positions of the high bits in-order.

10. The method of claim 9, wherein performing a group function on a corresponding group of bits of the binary vector for groups of bits includes:

performing calculations on the received binary vector to obtain a vector including a calculation of exactly 0 and exactly 1 (EX0, EX1) bits high for a single bit group, for all the bits of the binary vector;

distributing all of the bits of the binary vector into groups of bits; and calculating group functions on the groups of bits to produce corresponding group results, each group result including a number of high bits in the corresponding group of bits.

11. The method of claim 9, wherein performing a group function on a corresponding group of bits of the binary vector for groups of bits includes:

performing calculations on the received binary vector to obtain a vector including a calculation of exactly 0, exactly 1, exactly 2, and exactly 3 (EX0, EX1, EX 2, EX3) bits high for a single bit group, for all the bits of the binary vector;

distributing all of the bits of the binary vector into groups of bits; and calculating group functions on the groups of bits to produce corresponding group results, each group result including a number of high bits in the corresponding group of bits.

12. The method of claim 9, wherein combining the parallel prefix tree output with the binary vector comprises utilizing a bitwise AND.

13. The method of claim 8, wherein the allocation state is a bitmask comprising an encoded vector indicating positions of high bits in-order within the bitmask from least significant to most significant.

14. The method of claim 13, wherein decoding the allocation state into entries for the lookup table comprises populating the lookup table with a decoded value indicating a base address for a register block determined by a location of a high bit in the encoded vector from least significant to most significant starting at a lookup table row 0 up to row N−1.

15. The method of claim 14, wherein the decoding is performed in two or more cycles of execution by combining the decoded value for a first N entries with the binary vector to produce an output and processing the output in subsequent cycles.

16. The method of claim 8, wherein the method is performed in one cycle of execution when the warp is created.

17. A parallel prefix circuit, comprising:

logic circuitry structured to form a parallel prefix tree that performs a plurality of group functions that each calculate a number of high bits of an input to produce an output, said logic circuitry further comprising:

receiving circuitry for receiving a binary vector having a length of M bits, the binary vector indicating one or more available blocks of memory in a register file memory;

performing circuitry to perform a parallel prefix scanning method to identify positions of high bits in-order within the binary vector to search for the one or more available blocks of memory in the register file memory and generate an allocation state for a warp; and decoding circuitry to decode the allocation state into entries for a lookup table used to generate memory addresses of available blocks of register file memory.

18. The parallel prefix circuit of claim 17, the logic circuitry further comprising:

encoded vector generation circuitry to combine the output with the binary vector to generate an encoded vector indicating positions of the high bits in-order with the binary vector.

19. The parallel prefix circuit of claim 17, wherein the logic circuitry comprises AND gates and OR gates.

20. The parallel prefix circuit of claim 17, wherein the output is structured to be combined with the input and processed over subsequent cycles of execution.

* * * * *